United States Patent
Hossain et al.

(10) Patent No.: US 12,162,000 B1
(45) Date of Patent: Dec. 10, 2024

(54) HYDROGEN PRODUCTION BY RED MUD-SUPPORTED NICKEL-BASED CATALYSTS AND METHODS OF PREPARATION THEREOF

(71) Applicant: KING FAHD UNIVERSITY OF PETROLEUM AND MINERALS, Dhahran (SA)

(72) Inventors: Mohammad Mozahar Hossain, Dhahran (SA); Wasim Ullah Khan, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 18/746,132

(22) Filed: Jun. 18, 2024

(51) Int. Cl.
*B01J 23/755* (2006.01)
*B01J 8/06* (2006.01)
(Continued)

(52) U.S. Cl.
CPC ............ *B01J 23/755* (2013.01); *B01J 8/065* (2013.01); *B01J 23/745* (2013.01); *B01J 35/51* (2024.01);
(Continued)

(58) Field of Classification Search
None
See application file for complete search history.

(56) References Cited

U.S. PATENT DOCUMENTS 3,759,843 A * 9/1973 Holscher ................ C11C 3/123
502/259
10,179,326 B2   1/2019 Basset et al.
(Continued)

FOREIGN PATENT DOCUMENTS

| CN | 104511278 A | 4/2015 | |
|---|---|---|---|
| KR | 102530270 B1 * | 5/2023 | .......... B01J 37/0027 |
| WO | WO-2005063615 A1 * | 7/2005 | .............. B01J 8/025 |

OTHER PUBLICATIONS

Machine Translation of Lim (Year: 2023).*
(Continued)

*Primary Examiner* — Michael Forrest
(74) *Attorney, Agent, or Firm* — Oblon, McClelland, Maier & Neustadt, L.L.P.

(57) ABSTRACT

A method for generating hydrogen ($H_2$) includes introducing a $H_2$-containing feed gas stream into a reactor containing a red mud-supported nickel (Ni-SRM) catalyst including Ni-SRM catalyst particles. The method further includes passing the $H_2$-containing feed gas stream through the reactor to contact the $H_2$-containing feed gas stream with the Ni-SRM catalyst particles at a temperature of 500° C. to 700° C. to form an activated Ni-SRM catalyst and terminating the introducing the $H_2$-containing feed gas stream. The method further includes introducing and passing $CH_4$-containing feed gas stream through the reactor to contact the $CH_4$-containing feed gas stream with the activated Ni-SRM catalyst at a temperature of 600° C. to 1000° C. thereby converting at least a portion of the $CH_4$ to carbon and $H_2$.

18 Claims, 8 Drawing Sheets

(51) Int. Cl.
  *B01J 23/745* (2006.01)
  *B01J 35/51* (2024.01)
  *B01J 37/03* (2006.01)
  *B01J 37/04* (2006.01)
  *B01J 37/18* (2006.01)
  *B82Y 30/00* (2011.01)
  *B82Y 40/00* (2011.01)
  *C01B 3/26* (2006.01)
  *C01B 32/162* (2017.01)

(52) U.S. Cl.
  CPC ............ *B01J 37/035* (2013.01); *B01J 37/04* (2013.01); *B01J 37/18* (2013.01); *C01B 3/26* (2013.01); *C01B 32/162* (2017.08); *B01J 2208/00893* (2013.01); *B82Y 30/00* (2013.01); *B82Y 40/00* (2013.01); *C01B 2202/34* (2013.01); *C01B 2202/36* (2013.01); *C01B 2203/0277* (2013.01); *C01B 2203/1011* (2013.01); *C01B 2203/1058* (2013.01); *C01B 2203/1082* (2013.01); *C01B 2203/1241* (2013.01); *C01P 2006/80* (2013.01)

(56) References Cited

U.S. PATENT DOCUMENTS

| | | | |
|---|---|---|---|
| 11,040,876 | B2 | 6/2021 | Hu et al. |
| 11,498,053 | B2 | 11/2022 | Alsolami et al. |
| 11,673,803 | B2 | 6/2023 | Verykios et al. |
| 2021/0051770 | A1* | 2/2021 | Appel ................. C01B 3/26 |
| 2021/0229074 | A1* | 7/2021 | Alsolami ............. B01J 23/85 |
| 2022/0073345 | A1* | 3/2022 | Magalhães Mendes ............. B01J 23/755 |

OTHER PUBLICATIONS

Liu et al. ; Preparation of Modified Red Mud-Supported Fe Catalysts for Hydrogen Production by Catalytic Methane Decomposition ; Journal of Nanomaterials vol. 2017 ; Nov. 27, 2017 ; 12 Pages.

Cao et al. ; Homogeneous precipitation method preparation of modified red mud supported Ni mesoporous catalysts for ammonia decomposition ; Catalysis Science & Technology, Issue 2 ; Oct. 16, 2013 ; 5 Pages ; Abstract Only.

* cited by examiner

HYDROGEN PRODUCTION BY RED MUD-SUPPORTED NICKEL-BASED CATALYSTS AND METHODS OF PREPARATION THEREOF

CROSS REFERENCE TO RELATED APPLICATION

The present disclosure claims the benefit of Saudi Patent Application No. 1020242422 filed on May 7, 2024, with the Saudi Authority for Intellectual Property Office, which is incorporated herein by reference in its entirety.

BACKGROUND

Technical Field

The present disclosure is directed toward a method for hydrogen ($H_2$) production, more particularly, to red mud-supported nickel-based catalysts (Ni-SRM) for $H_2$ production.

Description of Related Art

The "background" description provided herein is to present the context of the disclosure generally. Work of the presently named inventors, to the extent it is described in this background section, as well as aspects of the description that may not otherwise qualify as prior art at the time of filing, are neither expressly nor impliedly admitted as prior art against the present invention.

Aluminum production from the Bayer process produces a waste material with strong alkalinity known as Red Mud (RM), and this waste material has found no effective way for its utilization; hence, RM is discarded either in a landfill or the sea. However, RM manifests environmental repercussions largely associated with the higher contents of toxic elements as well as high alkalinity with a pH ranging from 10 to 12.5 and high content of toxic trace elements leading to the contamination/pollution of soil, groundwater, and marine life.

RM primarily comprises compounds based on iron, alumina, silica, titania, alkali, and alkaline earth metals. The possibility of separating RM components may open an opportunity to recycle RM in an economical way. RM can also be processed to achieve a material with a targeted application. For example, the synthesis of hierarchical porous microspheres of alumina from RM serves as an efficient adsorbent for dye removal [See: Li J, Xu L, Sun P, Zhai P, Chen X, Zhang H, et al. *Novel application of red mud: Facile hydrothermal-thermal conversion synthesis of hierarchical porous AlOOH and $Al_2O_3$ microspheres as adsorbents for dye removal*]. RM may also be utilized as a volatile organic compound (VOC) oxidation catalyst due to its high iron content [See: Kim S C, Nahm S W, Park Y-K. *Property and performance of red mud-based catalysts for the complete oxidation of volatile organic compounds*]. Under a reductive environment, iron contents of RM may play a role in breaking carbon-carbon and/or carbon-hydrogen bonds i.e., cracking/pyrolysis of hydrocarbons The production of pure hydrogen with zero carbon footprint via catalytic methane decomposition (CMD) serves as an excellent technology and has gained significant attention in recent years [See: Qian J X, Chen T W, Enakonda L R, Liu D Bin, Basset J-M, Zhou L. *Methane decomposition to pure hydrogen and carbon nanomaterials: State-of-the-art and future perspectives. Int J Hydrogen Energy* and Abbas H F, Wan Daud W M A. *Hydrogen production by methane decomposition: A review. Int J Hydrogen Energy*]. Among the transition metal-based catalysts investigated for CMD, iron-based catalysts have been found to demonstrate excellent activity during CMD regardless of the type of reactor, such as, but not limited to, fixed-bed and fluidized-bed reactors [See: Geng S, Han Z, Hu Y, Cui Y, Yue J, Yu J, et al. *Methane Decomposition Kinetics over $Fe_2O_3$ Catalyst in Micro Fluidized Bed Reaction Analyzer. Ind & Eng Chem Res*]. Therefore, scientists have made efforts to test RM, which is rich in iron, for CMD. RM has been utilized as a catalyst during the catalytic decomposition of ethylene-produced multi-walled carbon nanotubes (MWCNT) at 650° C. in a fluidized-bed reactor [See: Dunens O M, MacKenzie K J, Harris A T. *Synthesis of multi-walled carbon nanotubes on 'red mud' catalysts*]. RM generated multi-walled carbon nanotubes (MWCNT) as high as 3.75 $g_c/g_{cat}$. Further, oxides of iron present in RM were reduced, stepwise, at 800° C. under methane ($CH_4$) and tested for catalytic decomposition of $CH_4$ by Balakrishnan and coworkers [See: Balakrishnan M, Batra V S, Hargreaves J S J, Monaghan A, Pulford I D, Rico J L, et al. *Hydrogen production from methane in the presence of red mud-making mud magnetic*]. A carbon deposition of 47.7% was reported, during 6 hours (h) time-on-stream at a similar reaction temperature of 650° C. The evaluation of a catalyst synthesized from modified RM demonstrated a $CH_4$ conversion of 26% at 800° C. [See: Fang X, Liu Q, Li P, Li H, Li F, Huang G. *A Nanomesoporous Catalyst from Modified Red Mud and Its Application for Methane Decomposition to Hydrogen Production*]. Furthermore, Geng and coworkers investigated the role of residual sodium oxide ($Na_2O$) in RM during CMD and found that the amount of sodium oxide not only suppresses the activation of $CH_4$ over the catalyst surface but also reduces maximal activity [See: Geng S, Zhang Z, Li J, Qian J, Liu J, Yu J, et al. *Catalytic behavior in $CH_4$ decomposition of catalysts derived from red mud: Impact of residual $Na_2O$*]. It was concluded that sodium oxide dispersed over iron oxide caused an inhibition effect leading to reduced activity of RM-based catalysts.

Although several RM-based catalysts were used in the past for CMD, each suffered from drawbacks hindering their adoption. Accordingly, an object of the present disclosure is to provide a catalyst that overcomes the limitations of the art.

SUMMARY

In an exemplary embodiment, a method for generating hydrogen ($H_2$). The method includes introducing an $H_2$-containing feed gas stream into a reactor containing a red mud-supported nickel (Ni-SRM) catalyst including Ni-SRM catalyst particles. Ni is present in the Ni-SRM catalyst at a concentration of 0.01 weight percentage (wt. %) to 30 wt. % based on a total weight of the Ni-SRM catalyst. The method further includes passing the $H_2$-containing feed gas stream through the reactor to contact the $H_2$-containing feed gas stream with the Ni-SRM catalyst particles at a temperature of 500° C. to 700° C. to form an activated Ni-SRM catalyst, terminating the introducing the $H_2$-containing feed gas stream. The method further includes introducing and passing a methane ($CH_4$)-containing feed gas stream through the reactor to contact the $CH_4$-containing feed gas stream with the activated Ni-SRM catalyst at a temperature of 600° C. to 1000° C. thereby converting at least a portion of the $CH_4$ to carbon (C) and $H_2$. Regenerating the Ni-SRM catalyst particles to form a regenerated Ni-SRM catalyst, and producing a residue gas stream leaving the reactor. The C formed is deposited on the surfaces of the Ni-SRM catalyst particles and separating the $H_2$ from the residue gas stream to generate an $H_2$-containing product gas stream.

In some embodiments, the reactor is at least one selected from the group consisting of a fixed-bed reactor, a trickle-bed reactor, a moving bed reactor, a rotating bed reactor, a fluidized bed reactor, and a slurry reactor.

In some embodiments, the reactor is a fixed-bed reactor in the form of a cylindrical reactor. The reactor includes a top portion, a cylindrical body portion, a bottom portion, a housing having an open top, and an open bottom supportably maintained with the cylindrical body portion. The Ni-SRM catalyst is supportably retained within the housing permitting fluid flow therethrough. The reactor further includes at least one propeller agitator is disposed in the bottom portion of the reactor, the bottom portion is cone-shaped or pyramidal, and a plurality of recirculation tubes fluidly connects the bottom portion of the cylindrical reactor with the cylindrical body portion of the cylindrical reactor.

In some embodiments, the $H_2$ is present in the $H_2$-containing feed gas stream at a concentration of 90 to 99.99 volume percentage (vol. %) based on a total volume of the $H_2$-containing feed gas stream, preferably 95 to 99 vol. % or about 98 vol. %.

In some embodiments, the $CH_4$ is present in the $CH_4$-containing feed gas stream at a concentration of 50 to 95 vol. % based on a total volume of the $CH_4$-containing feed gas stream, preferably 60 to 90 vol. % or 75 to 80 vol. %.

In some embodiments, the $CH_4$-containing feed gas stream further includes an inert gas selected from the group consisting of nitrogen, argon, and helium, and a volume ratio of the $CH_4$ to the inert gas present in the $CH_4$-containing feed gas stream is about 3:1, preferably 3-2:1-2 or 3:0.5-1.

In some embodiments, the $CH_4$-containing feed gas stream further includes ethane, ethylene, propane, propylene, carbon monoxide, a hydrocarbon containing C4-C9, and aromatics, and the C4-C9 hydrocarbon includes butane, butene, butyne, pentane, pentene, pentyne, hexane, hexene, hexyne, cyclohexane, cyclohexene, heptane, heptene, heptyne, octane, octene, octyne, nonane, nonene, nonyne, or mixtures thereof.

In some embodiments, the Ni-SRM catalyst includes $\alpha$-$Fe_2O_3$, $NiFe_2O_4$, NiO, $Fe(OH)_3 \cdot H_2O$, $TiO_2$, and aluminosilicate, as determined by X-ray diffraction (XRD) analysis.

In some embodiments, the Ni-SRM catalyst has a hydrogen temperature-programmed reduction ($H_2$-TPR) of 2.7 millimoles per gram (mmol/g) to 3.5 mmol/g, preferably 2.9 to 3.3 mmol/g or about 3 mmol/g.

In some embodiments, the Ni-SRM catalyst includes irregular shaped particles and spherical shaped particles. Preferably the spherical shaped particles are present in a major amount, such as at least 60% by number or at least 80% by number.

In some embodiments, the method includes passing the $CH_4$-containing feed gas stream through the reactor at an equivalent space velocity of 6000 milliliters per hour per gram of catalyst (mL/h/$g_{cat}$) to 10000 mL/h/$g_{cat}$ at a temperature of about 800° C., preferably 7000 to 9000 mL/h/$g_{cat}$.

In some embodiments, the C deposited on surface of the Ni-SRM catalyst particles is in the form of carbon nanotubes and carbon microtubes. Preferably the C includes carbon in the form of nanotubes that are bonded to the surface of the Ni-SRM at a terminus of the nanotube.

In some embodiments, the carbon nanotubes have an average diameter of 20 nanometers (nm) to 90 nm, preferably 40 to 80 nm or about 60 nm.

In some embodiments, the carbon microtubes have a length in a range of 1 micrometer (μm) to 10 millimeters (mm), preferably 3 to 7 mm or about 5 mm.

In some embodiments, the residue gas stream leaving the reactor is substantially free from carbon oxides ($CO_x$), sulfur oxides ($SO_x$) or nitrogen oxides ($NO_x$) or contains no $CO_x$, no $SO_x$ and no $NO_x$.

In some embodiments, the method has a $CH_4$ conversion of up to 80% based on an initial weight of the $CH_4$ present in the $CH_4$-containing feed gas stream, preferably from 50 to 80%.

In some embodiments, the method has a $H_2$ yield of up to 90% based on the $CH_4$ conversion, preferably from 50 to 80%.

In some embodiments, the method further includes preparing the Ni-SRM catalyst by mixing a nickel salt and a first solvent to form a first mixture, adjusting a pH of the first mixture to about 9, and mixing with a red mud material to form a reaction mixture. The method further includes heating the reaction mixture to form a catalyst precursor in the reaction mixture and precipitating the catalyst precursor from the reaction mixture by cooling and calcining at a temperature of 500° C. to 900° C., preferably 700° C. to 900° C. or about 900° C. to form the Ni-SRM catalyst. The Ni is present in the Ni-SRM catalyst at a concentration of 10 to 20 wt. % based on the total weight of the Ni-SRM catalyst, preferably 13 to 18 wt. % or about 15 wt. %.

In some embodiments, the nickel salt includes one or more of nickel sulfate, nickel acetate, nickel citrate, nickel iodide, nickel chloride, nickel perchlorate, nickel nitrate, nickel phosphate, nickel triflate, nickel bis(trifluoromethanesulfonyl)imide, nickel tetrafluoroborate, nickel bromide, and/or its hydrate.

In some embodiments, the red mud material has an $H_2$-TPR of about 2.82 mmol/g or from 2.75 to 2.85 mmol/g.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

When describing the present disclosure, the terms used are to be construed in accordance with the following definitions, unless a context dictates otherwise.

Embodiments of the present invention will now be described more fully hereinafter with reference to the accompanying drawings wherever applicable, in that some, but not all embodiments of the disclosure are shown.

In the drawings, reference numerals designate identical or corresponding parts throughout the several views. Further, as used herein, the words "a," "an," and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

As used herein, the term "porosity" refers to a measure of the void or vacant spaces within a material.

As used herein, the terms "particle size" and "pore size" may be thought of as the lengths or longest dimensions of a particle and of a pore opening, respectively.

As used herein, the term "ultrasonication" or "sonication" refers to the process in which sound waves are used to agitate particles in a solution.

As used herein the term "deionized water" refers to the water that has (most of) the ions removed.

As used herein, the term "calcination" refers to heating a compound to a high temperature, under a restricted supply of ambient oxygen. This is performed to remove impurities or volatile substances and to incur thermal decomposition.

As used herein, the term "thermal decomposition (or thermolysis)" refers to a chemical decomposition initiated by heat. The decomposition temperature is the temperature at which a substance undergoes chemical decomposition.

As used herein, the term 'temperature-programmed reduction (TPR)' refers to a technique for characterizing solid materials. It is often used in heterogeneous catalysis to find the optimal reduction conditions. An oxidized catalyst precursor is submitted to a programmed temperature rise, whereas a reducing gas mixture is flowed over it.

As used herein, the term "aspect ratio" refers to the ratio of length to width of cylinder.

As used herein, the term "weight hourly space velocity (WHSV)" refers to the weight of feed flowing per unit weight of the catalyst per hour.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium. Isotopes of naturally occurring nickel $^{28}$Ni include $^{58}$Ni, $^{60}$Ni, $^{61}$Ni, $^{62}$Ni, and $^{64}$Ni. Isotopes of iron include $^{54}$Fe, $^{56}$Fe, $^{57}$Fe, and $^{58}$Fe and isotopes of oxygen include $^{16}$O, $^{17}$O, and $^{18}$O. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

The present disclosure is intended to include all hydration states of a given compound or formula, unless otherwise noted or when heating a material.

The present disclosure is intended to include all isotopes of a given compound or formula, unless otherwise noted.

Aspects of the present disclosure are directed towards the utilization of nickel-doped-red mud as catalyst support for $CO_x$-free pure hydrogen from natural gas via catalytic methane decomposition (CMD). The catalyst of the present disclosure demonstrated improved enhanced hydrogen production.

Figure 1A:
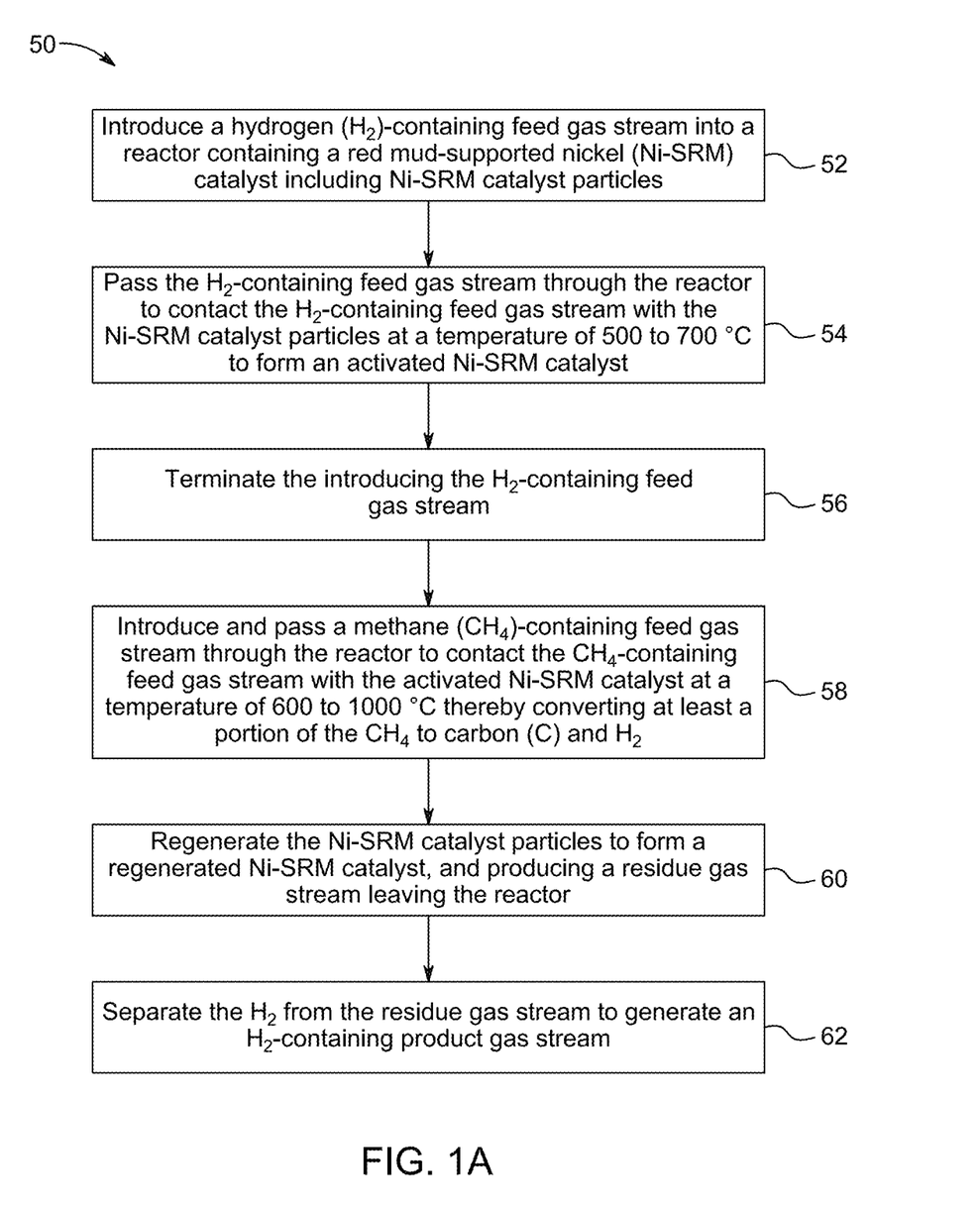
FIG. 1A is a flowchart illustrating a method for producing hydrogen ($H_2$) via catalytic methane decomposition (CMD), according to certain embodiments.

FIG. 1A illustrates a flow chart of a method 50 for producing hydrogen ($H_2$) via CMD. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes introducing a $H_2$-containing feed gas stream into a reactor containing a red mud supported nickel (Ni-SRM) catalyst including Ni-SRM catalyst particles. In some embodiments, the $H_2$ is present in the $H_2$-containing feed gas stream at a concentration of 90-99.99 vol. %, preferably 90.5-99.5 vol. %, preferably 91-99 vol. %, preferably 91.5-98.5 vol. %, preferably 92-98 vol. %, preferably 92.5-97.5 vol. %, preferably 93-97 vol. %, preferably 93.5-96.5 vol. %, preferably 94-96 vol. %, preferably 94.5-95.5 vol. %, based on the total volume of the $H_2$-containing feed gas stream.

In some embodiments, the reactor is at least one selected from the group consisting of a fixed-bed reactor, a trickle-bed reactor, a moving bed reactor, a rotating bed reactor, a fluidized bed reactor, and a slurry reactor. In a preferred embodiment, the reactor is a fixed-bed stainless steel tubular micro-reactor. In an embodiment, the reactor is the fixed-bed stainless steel tubular micro-reactor in the form of a cylindrical reactor including a top portion, a cylindrical body portion, a bottom portion, and a housing having an open top and open bottom supportably maintained with the cylindrical body portion. In some embodiments, the Ni-SRM is supportably retained within the housing permitting fluid flow therethrough. In some embodiments, the bottom portion is cone-shaped or pyramidal. In some embodiments, at least one propeller agitator is disposed of in the bottom portion of the reactor. In some embodiments, a plurality of recirculation tubes fluidly connects the bottom portion of the cylindrical reactor with the cylindrical body portion of the cylindrical reactor. In some embodiments, at least one propeller agitator disposed in the bottom portion of the reactor.

At step 54, the method 50 includes passing the $H_2$-containing feed gas stream through the reactor to contact the $H_2$-containing feed gas stream with the Ni-SRM catalyst particles at a temperature of 500-700 degrees Celsius (° C.), preferably 510-690° C., preferably 520-680° C., preferably 530-670° C., preferably 540-660° C., and preferably 550-650° C., to form an activated Ni-SRM catalyst. In a preferred embodiment, the $H_2$-containing feed gas stream is passed through the reactor to contact the $H_2$-containing feed gas stream with particles of the catalyst at a temperature of 600° C. to form a reduced catalyst.

At step 56, method 50 includes terminating the introduction of the $H_2$-containing feed gas stream. Subsequently, the reactor temperature is set to the targeted study condition under a continuous flow of an inert gas, preferably nitrogen, preferably argon, and more preferably helium. In a preferred embodiment, the reactor temperature is subsequently set to the targeted study condition under a continuous flow of nitrogen.

At step 58, the method 50 includes introducing and passing a methane ($CH_4$)-containing feed gas stream through the reactor to contact the $CH_4$-containing feed gas stream with the activated Ni-SRM catalyst at a temperature of 600-1000° C., preferably 620-980° C., preferably 640-960° C., preferably 660-940° C., preferably 680-920° C., preferably 700-900° C., preferably 720-880° C., preferably 740-860° C., preferably 760-840° C., and preferably 780-820° C. thereby converting at least a portion of the $CH_4$ to carbon (C) and $H_2$, and regenerating the Ni-SRM catalyst particles to form a regenerated Ni-SRM catalyst, and producing a residue gas stream leaving the reactor.

In some embodiments, the C formed is deposited on the surfaces of the Ni-SRM catalyst particles. The C deposited on the surfaces of the Ni-SRM catalyst particles is in the form of carbon nanotubes and carbon microtubes. In alternate embodiments, the C deposited on the surfaces of the Ni-SRM catalyst particles could be in different forms, such as cones, cuboidal, pyramidical, cylindrical, wires, crystals, rectangles, triangles, prisms, disks, cubes, ribbons, blocks, beads, discs, barrels, granules, whiskers, flakes, foils, powders, boxes, stars, flowers, polygonal like trigonal, pentagonal, hexagonal, etc., and mixtures thereof. In some embodiments, the carbon nanotubes have an average diameter of 20-90 nanometers (nm), preferably 25-85 nm, preferably 30-80 nm, preferably 35-75 nm, preferably 40-70 nm, preferably 45-65 nm, and preferably 50-60 nm. In some embodiments, the carbon microtubes have a length in a range of 1 micrometer (μm)-10 millimeters (mm) (10,000 μm), preferably 500-9000 μm, preferably 1000-8000 μm, preferably 2000-7000 μm, preferably 3000-6000 μm, and preferably 4000-5000 μm.

In some embodiments, the $CH_4$ is present in the $CH_4$-containing feed gas stream at a concentration of 50-95 vol. %, preferably 55-90 vol. %, preferably 60-85 vol. %, preferably 65-80 vol. %, and preferably 70-75 vol. %, based on a total volume of the $CH_4$-containing feed gas stream. In some embodiments, the $CH_4$-containing feed gas stream further includes an inert gas selected from the group consisting of nitrogen, argon, and helium. In a preferred embodiment, the $CH_4$-containing feed gas stream further includes nitrogen gas as the inert gas. In some embodiments, the volume ratio of the $CH_4$ to the inert gas present in the $CH_4$-containing feed gas stream is from 1:1-5:1, preferably 2:1-4:1, and more preferably 3:1. In a preferred embodiment, the volume ratio of the $CH_4$ to the inert gas present in the $CH_4$-containing feed gas stream is about 3:1.

The $CH_4$-containing feed gas stream through the reactor is performed at an equivalent space velocity of 6000-10000 ml/$hg_{cat}$, preferably 6500-9500 ml/$hg_{cat}$, preferably 7000-9000 ml/$hg_{cat}$, preferably 7500-8500 ml/$hg_{cat}$ at a temperature of about 500-900° C., preferably 510-890° C., preferably 520-880° C., preferably 530-870° C., preferably 540-860° C., preferably 550-850° C., preferably 560-840° C., preferably 570-830° C., preferably 580-820° C., preferably 590-810° C., preferably 600-800° C., preferably 610-790° C., preferably 620-780° C., preferably 630-770° C., preferably 640-760° C., preferably 650-750° C., preferably 660-740° C., preferably 670-730° C., preferably 680-720° C., and preferably 690-710° C. In a preferred embodiment, the $CH_4$-containing feed gas stream through the reactor is performed at an equivalent space velocity of 8000 ml/hg cat at a temperature of about 800° C.

The $CH_4$-containing feed gas stream further includes ethane, ethylene, propane, propylene, carbon monoxide, a hydrocarbon containing C4-C9, and aromatics. The C4-C9 hydrocarbon includes butane, butene, butyne, pentane, pentene, pentyne, hexane, hexene, hexyne, cyclohexane, cyclohexene, heptane, heptene, heptyne, octane, octene, octyne, nonane, nonene, nonyne, or mixtures thereof.

In some embodiments, the method has a $CH_4$ conversion of up to 80%, preferably 60%, preferably 65%, preferably 70%, preferably 75%, and preferably 80%, based on an initial weight of the $CH_4$ present in the $CH_4$-containing feed gas stream. In a preferred embodiment, the method has a $CH_4$ conversion of 75% based on the initial weight of the $CH_4$ present in the $CH_4$-containing feed gas stream. In some embodiments, the method has a $H_2$ yield of up to 90%, preferably 60%, preferably 65%, preferably 70%, preferably 75%, preferably 80%, preferably 85%, and preferably 90% based on $CH_4$ conversion.

At step 60, the method 50 includes regenerating the Ni-SRM catalyst particles to form a regenerated Ni-SRM catalyst and producing a residue gas stream leaving the reactor. In some embodiments, the residue gas stream leaving the reactor is substantially free from carbon oxides ($CO_x$).

At step 62, the method 50 includes separating the $H_2$ from the residue gas stream to generate a $H_2$-containing product gas stream. The $H_2$ may be separated from the residue gas stream by any of the techniques known in the art.

Figure 1B:
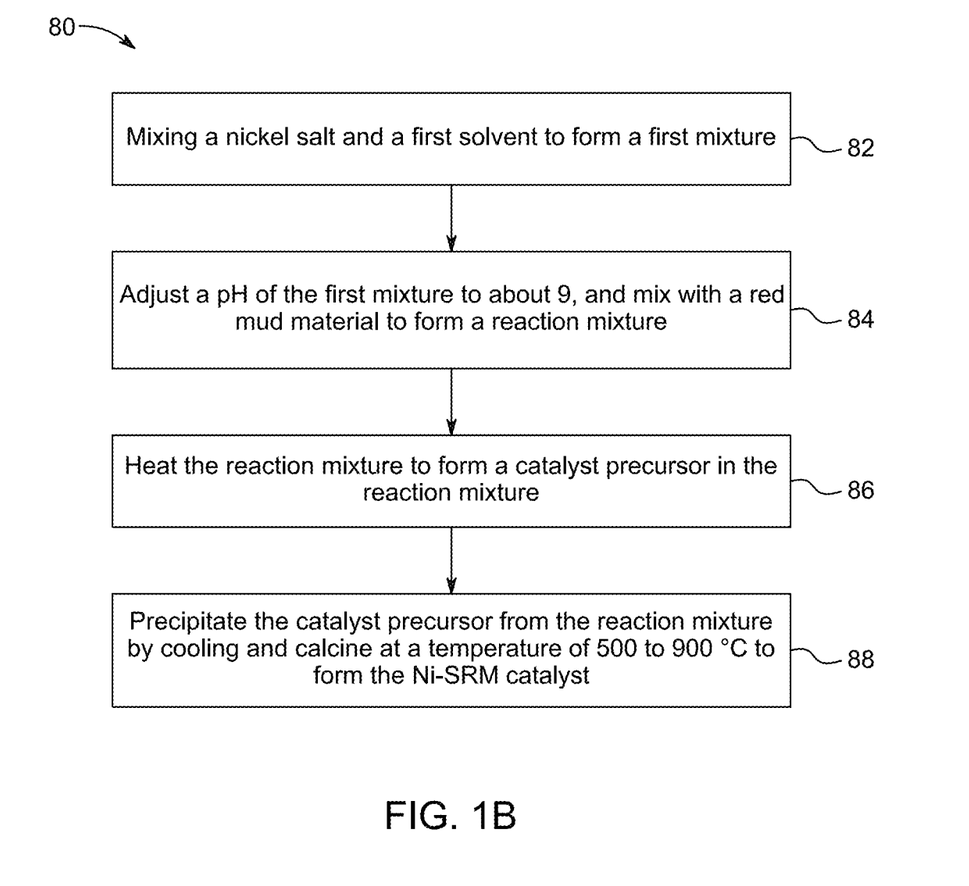
FIG. 1B is a flowchart illustrating a method for preparing a red mud-supported nickel-based catalyst (Ni-SRM), according to certain embodiments.

FIG. 1B illustrates a flow chart of a method 80 for preparing the Ni-SRM catalyst. The order in which the method 80 is described is not intended to be construed as a limitation, and any number of the described method steps can be combined in any order to implement the method 80. Additionally, individual steps may be removed or skipped from the method 80 without departing from the spirit and scope of the present disclosure.

At step 82, the method 80 includes mixing a nickel salt and a first solvent to form a first mixture. The nickel salt includes nickel sulfate, nickel acetate, nickel citrate, nickel iodide, nickel chloride, nickel perchlorate, nickel nitrate, nickel phosphate, nickel triflate, nickel bis(trifluoromethanesulfonyl)imide, nickel tetrafluoroborate, nickel bromide, and/or its hydrate. In a preferred embodiment, the nickel salt is nickel nitrate hexahydrate [$Ni(NO_3)_2 \cdot 6H_2O$]. The solvent may be water, methanol, ethanol, acetone, dimethyl sulfoxide (DMSO), dimethylformamide (DMF), dimethylacetamide, isopropanol, benzene, hexane, carbon tetrachloride, toluene, diethyl ether, tetrahydrofuran, chloroform, or a mixture thereof. The water may be tap water, distilled water, bidistilled water, deionized water, deionized distilled water, reverse osmosis water, and/or some other water. In a preferred embodiment, the solvent is deionized water. The mixing may be carried out manually or with the help of a stirrer.

At step 84, the method 80 includes adjusting the pH of the first mixture to about 9 and mixing with a red mud material to form a reaction mixture. The pH may be attained by adding an alkaline solution like sodium hydroxide (NaOH), potassium hydroxide (KOH) rubidium hydroxide (RbOH), cesium hydroxide (CsOH), potassium acetate, potassium bicarbonate ($KHCO_3$), and potassium carbonate ($K_2CO_3$). In a preferred embodiment, the pH may be adjusted using KOH and $K_2CO_3$. The mixing may be carried out manually, with the help of a stirrer, or via ultrasonication.

At step 86, method 80 includes heating the reaction mixture to form a catalyst precursor. Heating appliances such as hot plates, heating mantles, hot air ovens, microwaves, autoclaves, tapes, oil baths, salt baths, sand baths, air baths, hot-tube furnaces, and hot-air guns can be used to do this. In a preferred embodiment, a hot air oven is used to heat the reaction mixture.

At step 88, the method 80 includes precipitating the catalyst precursor from the reaction mixture by cooling and calcining at a temperature of 500-900° C. to form the Ni-SRM catalyst. The precipitate may be separated from the reaction mixture by methods including, but not limited to, filtration, decantation, and evaporation. The calcination of the precipitate is carried out by heating it to a high temperature, under a restricted supply of ambient oxygen. This is performed to remove impurities or volatile substances and to incur thermal decomposition. Typically, the calcination is carried out in a furnace, preferably equipped with a temperature control system, which may provide a heating rate of up to 50° C./min, preferably up to 40° C./min, preferably up to 30° C./min, preferably up to 20° C./min, preferably up to 10° C./min, preferably up to 5° C./min, preferably up to 2° C./min, and preferably up to 1° C./min. In some embodiments, the reaction mixture is calcined at a temperature of 500-900° C., preferably 510-890° C., preferably 520-880° C., preferably 530-870° C., preferably 540-860° C., preferably 550-850° C., preferably 560-840° C., preferably 570-830° C., preferably 580-820° C., preferably 590-810° C., preferably 600-800° C., preferably 610-790° C., preferably 620-780° C., preferably 630-770° C., preferably 640-760° C., preferably 650-750° C., preferably 660-740° C., preferably 670-730° C., preferably 680-720° C., and preferably 690-710° C. for 1-6 h, preferably 2-5 h, and preferably 3-4 h to form the Ni-SRM catalyst. In a preferred embodiment, the reaction mixture is calcined at a temperature of 550° C. for 5 h to form the Ni-SRM catalyst.

In some embodiments, Ni is present in the Ni-SRM catalyst at a concentration of 0.01-30 wt. %, preferably 0.5-29.5 wt. %, preferably 1-29 wt. %, preferably 2-28 wt. %, preferably 3-27 wt. %, preferably 4-26 wt. %, preferably 5-25 wt. %, preferably 6-24 wt. %, preferably 7-23 wt. %, preferably 8-22 wt. %, preferably 9-21 wt. %, preferably 10-20 wt. %, preferably 11-19 wt. %, preferably 12-18 wt. %, preferably 13-17 wt. %, preferably 14-16 wt. %, based on a total weight of the Ni-SRM catalyst. In some embodiments, the Ni is present in the Ni-SRM catalyst at a concentration of 10-20 wt. %, preferably 11-19 wt. %, preferably 12-18 wt. %, preferably 13-17 wt. %, preferably 14-16 wt. %, based on total weight of the Ni-SRM catalyst.

In some embodiments, the Ni-SRM catalyst includes irregular shaped particles and spherical-shaped particles. In alternate embodiments, the Ni-SRM catalyst may include particles with different shapes, such as cones, cuboidal, pyramidical, cylindrical, wires, crystals, rectangles, triangles, prisms, disks, cubes, ribbons, blocks, beads, discs, barrels, granules, whiskers, flakes, foils, powders, boxes, stars, flowers, polygonal like trigonal, pentagonal, hexagonal, etc., and mixtures thereof. In some embodiments, the Ni-SRM catalyst includes $\alpha$-$Fe_2O_3$, $NiFe_2O_4$, NiO, $Fe(OH)_3 \cdot H_2O$, $TiO_2$, and aluminosilicate, as determined by X-ray diffraction (XRD) analysis.

In some embodiments, the Ni-SRM catalyst has a hydrogen TPR ($H_2$-TPR) of from 2.7-3.5 millimoles of $H_2$ per gram of the Ni-SRM catalyst (mmol/g), preferably 2.8-3.4 mmol/g, preferably 2.9-3.3 mmol/g, and preferably 3.0-3.2 mmol/g. In a preferred embodiment, the Ni-SRM catalyst has a $H_2$-TPR of 3.4 mmol/g. In some embodiments, the red mud material has a $H_2$-TPR of about 2.82 mmol/g.

EXAMPLES

The following examples demonstrate a method for producing hydrogen. The examples are provided solely for illustration and are not to be construed as limitations of the present disclosure, as many variations thereof are possible without departing from the spirit and scope of the present disclosure.

Example 1: Catalyst Preparation

The catalysts were prepared by depositing nickel (Ni) on pretreated industrial solid waste material such as red mud (SRM), which mainly contains $Fe_2O_3$ (50%), $Al_2O_3$ (20%), $SiO_2$ (20 wt. %) and remaining $CaO/Na_2O$. Before Ni loading, the support material was treated and calcined at 800° C. The specific surface area of the calcined support was 20±4 square meters per gram ($m^2$/g) with a pore volume of 0.0540±0.002 cubic centimeters per gram ($cm^3$/g). In catalyst preparation, the required amount of calcined SRM was dissolved in 10 milliliters (mL) of deionized (DI) water. A solution consisting of water, potassium hydroxide (KOH) and potassium carbonate ($K_2CO_3$) was prepared. Further, the required amount of nickel nitrate hexahydrate solution was added to 6 grams (g) of SRM that was previously sonicated for 20 minutes (min). Furthermore, the KOH and $K_2CO_3$ solutions were added. The final mixture was heated at 80° C. for one hour (h) under mixing. Moreover, the slurry was transferred to an oven and heated for one more hour. The solid material was separated and washed with water. Finally, the material was calcined at 550° C. for 5 h. The same procedure was followed to prepare catalysts with different Ni content.

Example 2: Catalyst Characterization

X-ray diffraction (XRD) study of catalyst samples is carried out by Rigaku diffractometer using copper (Cu) K$\alpha$ radiation source operated at 40 kilovolts (kV) and 15 milliamperes (mA). A 0.02 step size with a 10 to 90 scanning range was set up for analysis. Phase analyses are carried out by using X'pert high score plus software matched with the joint committee on powder diffraction standards (JCPDS) database. $N_2$-physiosorption isotherms study of catalyst sample is carried over Micromeritics Tristar II 3020. Surface area is estimated by the Brunauer-Emmet Teller (BET) method whereas pore volume and pore diameter are estimated by the Barrett-Joyner-Halenda (BJH) method. The reducibility of the catalyst sample is studied by $H_2$-temperature-programmed reduction (TPR) over Micromeritics Auto Chem II 2920, USA. 70 mg of the sample was subjected to a heat treatment at 10 degrees Celsius per minute (° C./min) up to 900° C. under 30 milliliters per minute (mL/min) gas flow of 10% $H_2$—Ar mixture gas.

Example 3: Catalytic Activity Test

Catalytic decomposition of methane is carried out over 0.15 g catalyst packed in fixed-bed stainless steel tubular micro-reactor (PID Eng & Tech micro activity reference company; L=30 cm, I.D=9.1 mm) at atmospheric pressure. The temperature within the reactor is monitored by an axially positioned K-type stainless steel sheathed thermocouple at the center of the catalyst bed. Before the reaction, the catalyst was activated under 40 mL/min flow of $H_2$ for 60 min at 600° C. followed by purging of $N_2$ for 15 min to remove the remnant of $H_2$. Further, the temperature of reactor is raised to 800° C. under the flow of $N_2$. 15 mL/min methane ($CH_4$) and 5 mL/min $N_2$ (total flow rate of feed gas 20 mL/min) are allowed to pass through the catalyst bed at 800° C. at an equivalent space velocity of 8000 milliliters per hour per gram of catalysts (mL/h/$g_{cat}$). GC-2014 SHIMADZU (Column: molecular sieve 5 A and Porapak Q; carrier gas: Argon) equipped with conductivity detector was used to analyze the feed and output gas composition. The expression for $CH_4$ conversion, hydrogen production rate, and carbon yield is given as $$CH_4 \text{ conversion} = \frac{CH_{4,in} - CH_{4,out}}{CH_{4,in}} \times 100\%$$

$$H_2 \text{ rate} = \frac{F_{CH4} \times X_{CH4}}{m}$$

$$\text{Carbon yield} = \frac{\text{weight of carbon formed}}{\text{weight of total metal contents}} \times 100\%$$

Example 4: Characterizations of Catalysts Before Reaction

Figure 2:
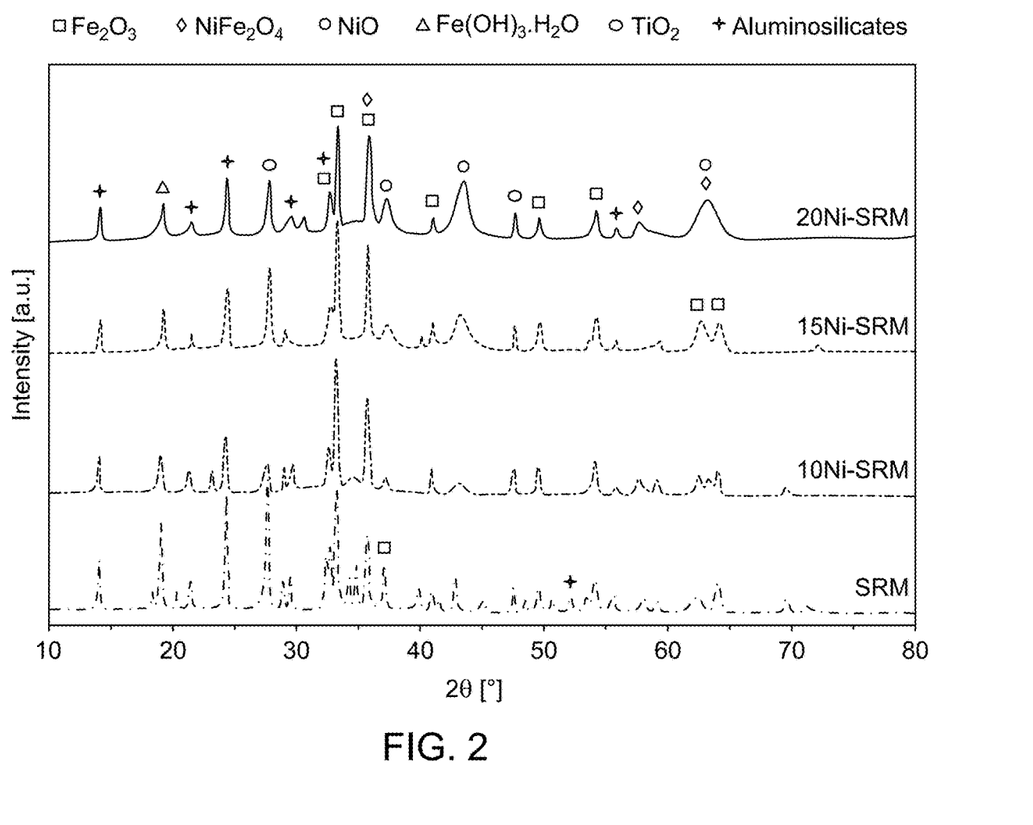
FIG. 2 shows X-ray diffraction (XRD) profiles of an SRM catalyst and different weight percentages of Ni-SRM catalysts, according to certain embodiments.

The crystallographic data using XRD of various nickel-based catalysts supported on RM are shown in FIG. 2, which shows profiles of an SRM catalyst and different weight percentages of Ni-SRM catalysts. The XRD patterns demonstrate a range of diffraction peaks that can be a measure of RM components. The XRD profiles of sole RM exhibit patterns at 32.5°, 35.5°, 41°, 49.5°, 54.5°, 63°, and 64.5° that are attributed to the hematite phase, $\alpha$-$Fe_2O_3$, while representative peaks at 27.5° and 47.6° belong to $TiO_2$. The peaks at 14°, 22°, 28°, 32.5°, and 52° are ascribed to aluminosilicates of sodium and calcium, respectively. The existence of a diffraction peak at 19° is associated with iron hydroxide hydrate ($Fe(OH)_3 \cdot H_2O$). Additional diffraction peaks are observed for nickel-based catalysts, which are associated with nickel oxide (NiO) and $NiFe_2O_4$. Interestingly, the addition of nickel influences the hematite peaks and starts to disappear at higher nickel loadings.

Figure 3:
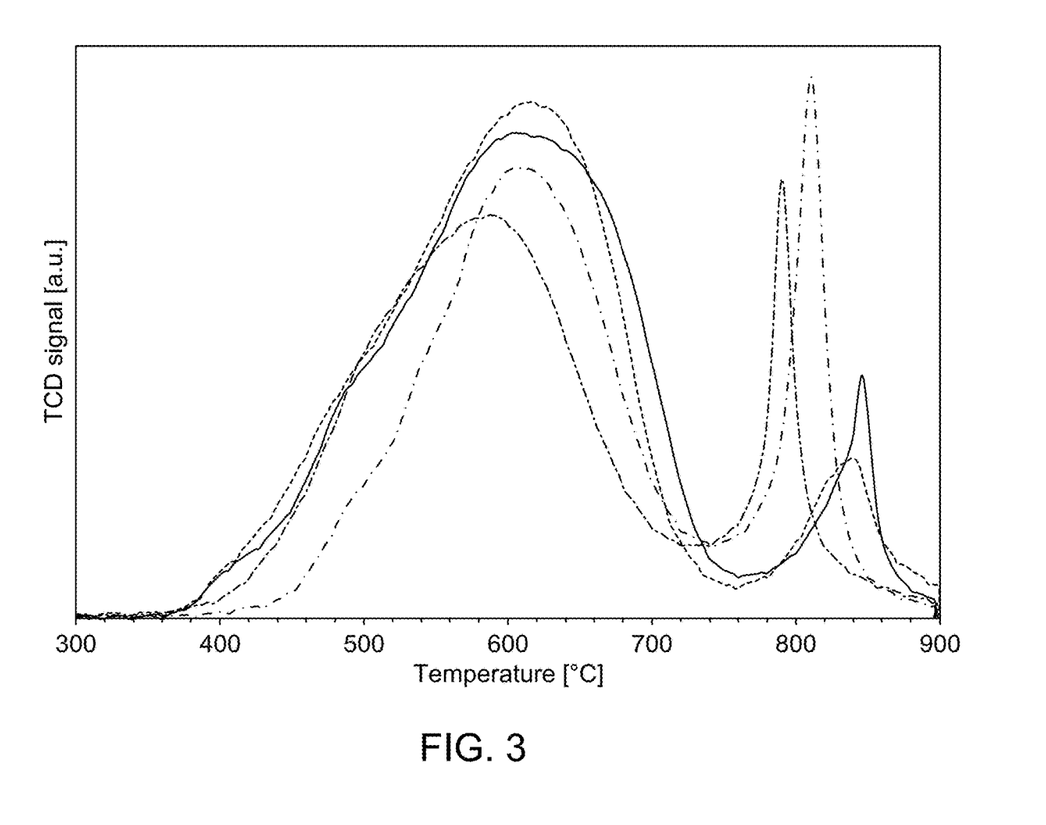
FIG. 3 shows temperature-programmed reduction (TPR) profiles for Ni-SRM catalysts, according to certain embodiments.

Temperature-programmed reduction (TPR) using hydrogen as probe gas ($H_2$-TPR) is used to evaluate several reducible species and metal-support interactions that may influence the catalytic performance of as-synthesized catalysts. Reduction profiles of RM-supported nickel-based catalysts are shown in FIG. 3. As can be seen from FIG. 3, the reduction profile of the pure RM indicates two peaks. XRD data has revealed that the major component of RM with reducible species is hematite ($\alpha$-$Fe_2O_3$); hence, the two peaks may be assigned to the two-step reduction of hematite species. Therefore, the medium-temperature peak, ranging from 400° C. to 740° C., may be assigned to the reduction of isolated $Fe_2O_3$ to $Fe_3O_4$, while the reduction peak at higher temperatures (740-900° C.) may be due to the reduction of $Fe_3O_4$ to FeO/Fe. The doping of nickel over the RM may influence the reduction behavior of the supported catalysts. In an example, the catalyst with a lower nickel loading of around 10 wt. % (10 Ni-SRM) shifts both the reduction peak maxima to a lower temperature; as such, the medium-temperature peaks shift from 610° C. to 580° C. and higher temperature peaks shift from 810° C. to 790° C., respectively. This indicates that nickel doping facilitates the reduction of oxide species; however, the hydrogen uptake for 10 Ni-SRM (2.77 mmol/g) is lower than SRM (2.82 mmol/g), indicating loss of a number of reducible species associated with coverage of hematite species with nickel. The catalysts with higher nickel loadings of 15 wt. % and 20 wt. % (15 Ni-SRM and 20 Ni-SRM) have shown approximately similar peak maxima as that of SRM in the medium-temperature regions. However, peak maxima are shifted from 810° C. (SRM) to 845° C. (15 Ni-SRM) and 840° C. (20 Ni-SRM), respectively, in higher temperature regions. This observation indicates that higher nickel loadings promote interaction between nickel and hematite, leading to the formation of less reducible spinel nickel ferrites ($NiFe_2O_4$). Furthermore, hydrogen uptakes for 15 Ni-SRM (3.33 mmol/g) and 20 Ni-SRM (3.40 mmol/g) are also higher than SRM (2.82 mmol/g), indicating a higher number of reducible species in these catalysts. It may be concluded that nickel doping at lower loading (10 Ni-SRM) facilitates easier reduction of oxide species, while reduction becomes challenging at higher nickel loadings due to the formation of spinel species. Moreover, the major portion of reduction peaks is covered by medium-temperature peaks.

Example 5: Activity Performance

Figure 4:
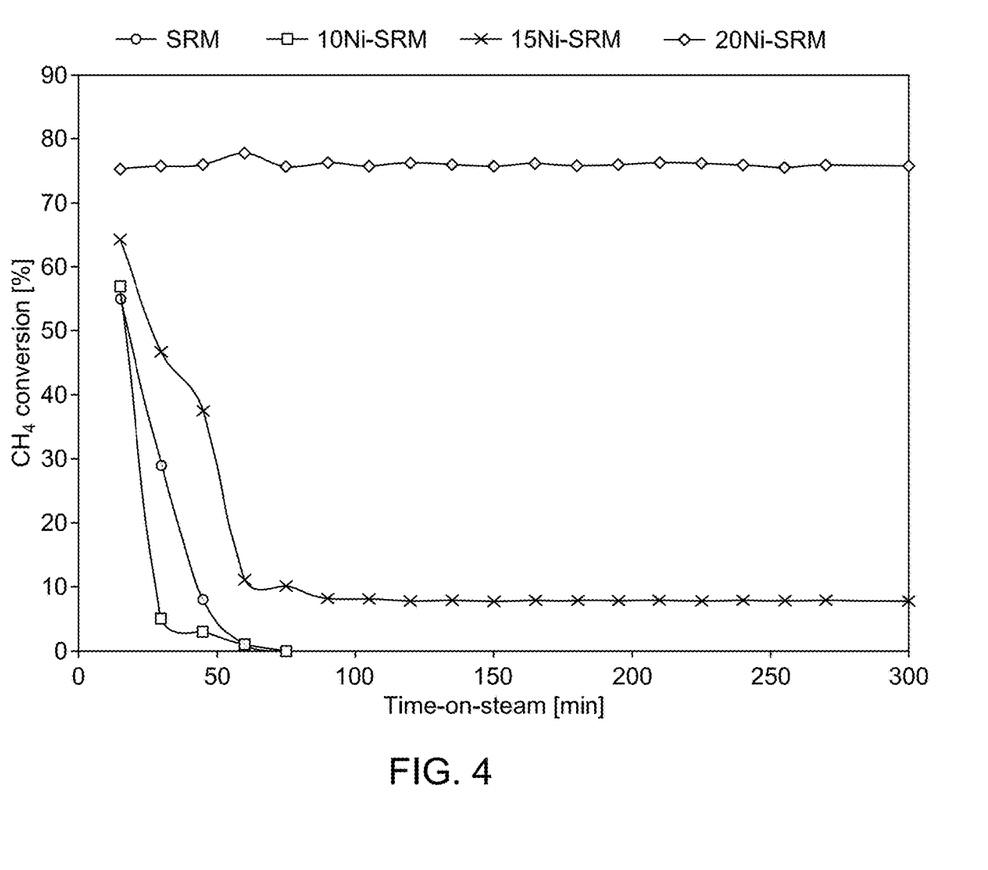
FIG. 4 shows methane conversion versus time-on-stream for various Ni-SRM catalysts, according to certain embodiments.

The activity tests are performed at 700° C. and 1 atmospheric (atm) pressure using 90% $CH_4$ diluted with argon at a gas hourly space velocity of 5000 ml/h/$g_{cat}$. Before the reaction, the catalysts were activated using pure hydrogen at a rate of 20 ml/min by raising the temperature from room temperature to 700° C. and keeping the catalyst at this temperature for 15 minutes (min). The conversion versus time-on-stream data, as shown in FIG. 4, depicts that SRM support and lower-loading nickel-based catalysts (10 Ni-SRM) deactivated immediately within 1.5 h after demonstrating an initial activity. However, higher nickel loading catalysts showed a varying trend concerning activity such as, 15 Ni-SRM deactivated during the first 90 min before being stable at around 8% conversion for 4 h time-on-stream. On the contrary, 20 Ni-SRM exhibited stable performance with around 75% $CH_4$ conversion throughout the reaction duration of 5 h.

In general, metal particle sintering, and carbon encapsulation affect catalyst deactivation during methane decomposition. This suggests that both the sintering and the encapsulating carbon covering the active sites over SRM and SRM-supported nickel-based catalysts may be responsible for quick deactivation of catalysts such as 10 Ni-SRM and 15 Ni-SRM) with high initial activity.

A comparison of the present disclosure with prior arts reporting red mud catalysts investigated for $CH_4$ decomposition reaction is compiled in Table 1. As shown in Table 1, the activity results show that nickel catalysts supported on red mud have outperformed catalysts as reported in prior art. Further, an in-situ X-ray diffraction (XRD) study revealed that red mud samples witnessed phase transformation during temperature ramp under methane. The above-mentioned variations in the phases, such as the major component (hematite) to magnetite and the formation of iron and iron carbide and graphite, affect the hydrogen production rate, as shown in Table 1. It was observed that the formation of carbon oxides, as well as enhanced specific surface areas of spent catalysts, was associated with the formation of carbon nanospheres and multi-walled carbon nanotubes. However, the catalysts, as described by the present disclosure, did not show any significant formation of carbon oxides. In a similar work, the role of red mud sample's composition and variation in alkali metal content during hydrogen production from methane discovered that the sample with high titania content had lower activity as compared to the red mud sample with similar iron contents [See: Balakrishnan M, Batra V S, Hargreaves J S J, Monaghan A, Pulford I D, Rico J L, et al. Hydrogen production from methane in the presence of red mud-making mud magnetic. *Green Chem* 2009; 11:42-7, incorporated herein by reference in its entirety]. They also reported the formation of magnetic carbon, with the potential of wastewater treatment, as a co-product. The modification of red mud to synthesize nanomesoporous samples was investigated for its application in methane decomposition reaction [See: Fang X, Liu Q, Li P, Li H, Li F, Huang G. A Nanomesoporous Catalyst from Modified Red Mud and Its Application for Methane Decomposition to Hydrogen Production. *J Nanomater* 2016; 2016:1-8, incorporated herein by reference in its entirety]. The modification process induced physical and chemical changes in dry red mud sample. The resulting modified red mud sample showed higher specific surface area (190.6 m$^2$/g), and pore volume (0.39 cm$^3$/g) that facilitated higher methane conversion (~26%) of modified red mud sample in comparison with dry red mud sample (11.9%). The role of residual sodium oxide ($Na_2O$) in influencing the catalytic behavior of red mud samples during methane decomposition has been investigated [See: Geng S, Zhang Z, Li J, Qian J, Liu J, Yu J, et al. Catalytic behavior in $CH_4$ decomposition of catalysts derived from red mud: Impact of residual $Na_2O$. *Int J Hydrogen Energy* 2022; 47:7836-45, incorporated herein by reference in its entirety]. The catalytic activity performance results showed that the amount and dispersion of residual sodium had an inhibitory impact on methane activation and maximal conversions. All the catalysts with least amount of residual sodium went through a conversion maximum before they deactivated.

TABLE 1

A comparative study of the present disclosure with respect to reported prior arts.

| | Operating conditions | | Activity | | |
| | | | Max. Methane | Max. | |
| Catalyst | Reaction Temp. (° C.) | GHSV (L/h. g$_{cat.}$) | conversion (%) | Hydrogen rate (μmol/g/s) | Ref. |
| --- | --- | --- | --- | --- | --- |
| RM4 | 800 | 9 | 19.8 | 18 | Balakrishnan M, |
| RM6 | | | — | 7.7 | Batra V S, et al. |
| RM7 | | | — | 3.5 | Hydrogen production from methane in the presence of red mud-making mud magnetic. Green Chem 2009; 11: 42-7 |
| Geothite RM7 | 800 | 9 | — | 5.7 | Sushil S, Alabdulrahman A M, et al. Carbon deposition and phase transformations in red mud on exposure to methane. J Hazard Mater 2010; 180: 409-18. |
| | | | — | 5.7 | |
| DW1 | 750 | 12 | 16.8 | 11.5 | Geng S, Zhang Z, Li J, et al. Catalytic behavior in $CH_4$ decomposition of catalysts derived from red mud: Impact of residual $Na_2O$. Int J Hydrogen Energy 2022; 47: 7836-45 |
| DW3 | | | 17.6 | 12.0 | |
| DW6 | | | 18.7 | 12.7 | |
| Dry RM modified red mud (MRM) | 800 | 4.8 | 21.2 | 5.8 | Fang X, Liu Q, Li P, A Nanomesoporous Catalyst from Modified Red Mud and Its Application for Methane Decomposition to Hydrogen Production. J Nanomater 2016; 2016: 1-8. |
| | | | 25.0 | 6.8 | |
| 20 Ni-SRM | 700 | 5 | 75* | 19.2 | Present disclosure |

Example 6: Post-Reaction Characterization of Catalysts

Figure 5A:
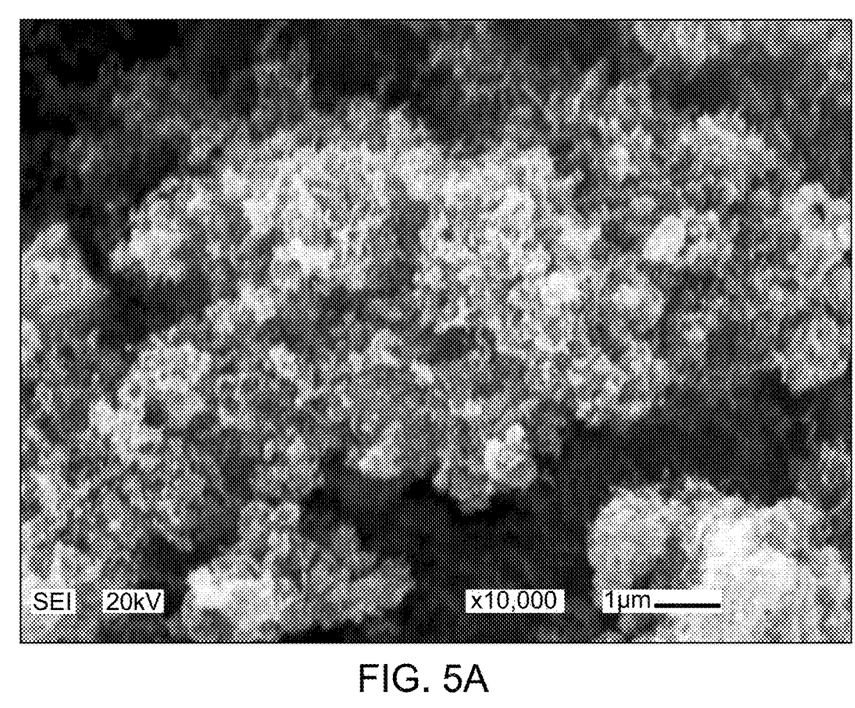
FIG. 5A is a scanning electron microscopy (SEM) image of a 20-weight percentage (20 wt. %) Ni-doped SRM catalyst (20 Ni-SRM) at 1 micrometer (μm) magnification, according to certain embodiments.
Figure 5B:
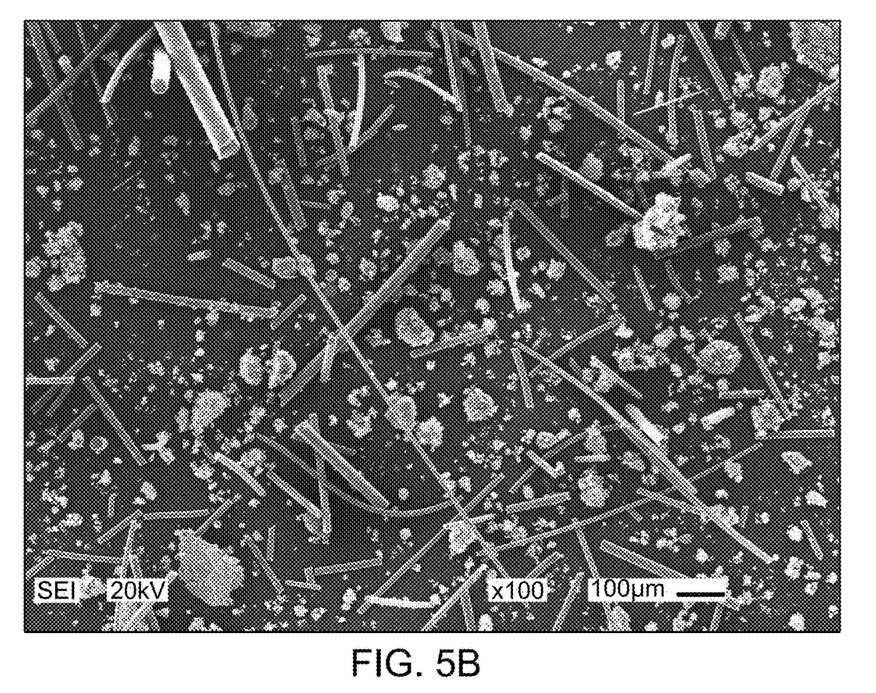
FIG. 5B is an SEM image of the 20 Ni-SRM catalyst, at 100 μm magnification, according to certain embodiments.
Figure 6A:
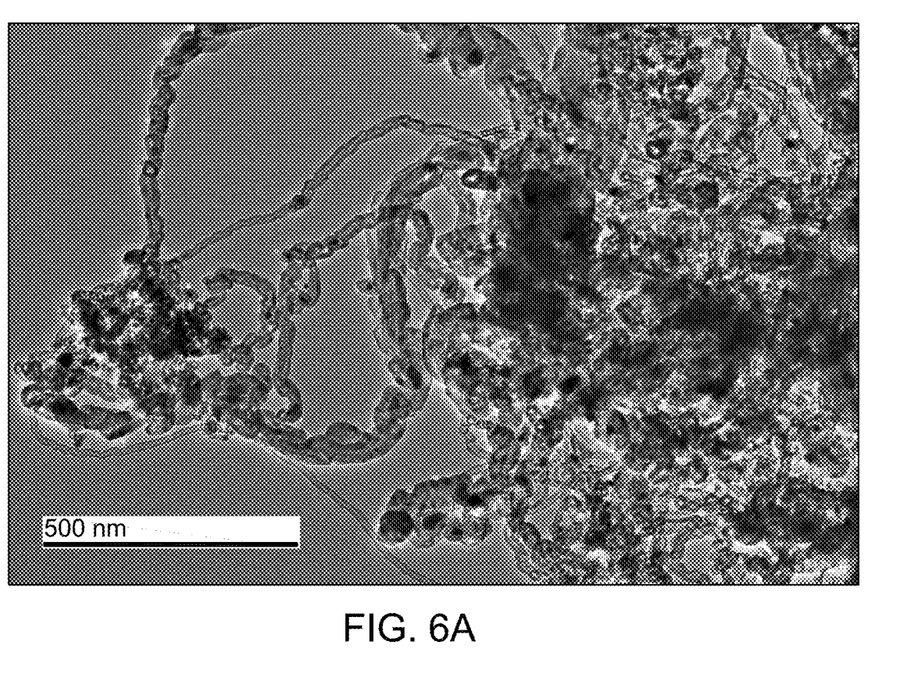
FIG. 6A is a transmission electron microscopy (TEM) image of the 20 Ni-SRM catalyst at 500 nanometers (nm) magnification, according to certain embodiments.
Figure 6B:
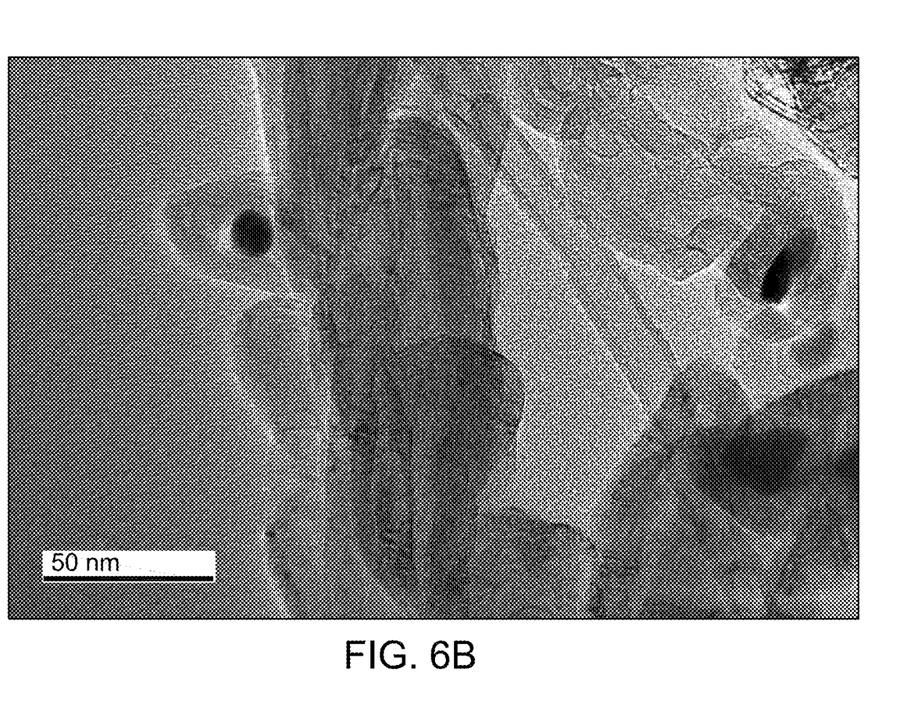
FIG. 6B is a TEM image of the 20 Ni-SRM catalyst at a 50 nm magnification, according to certain embodiments.
Figure 7:
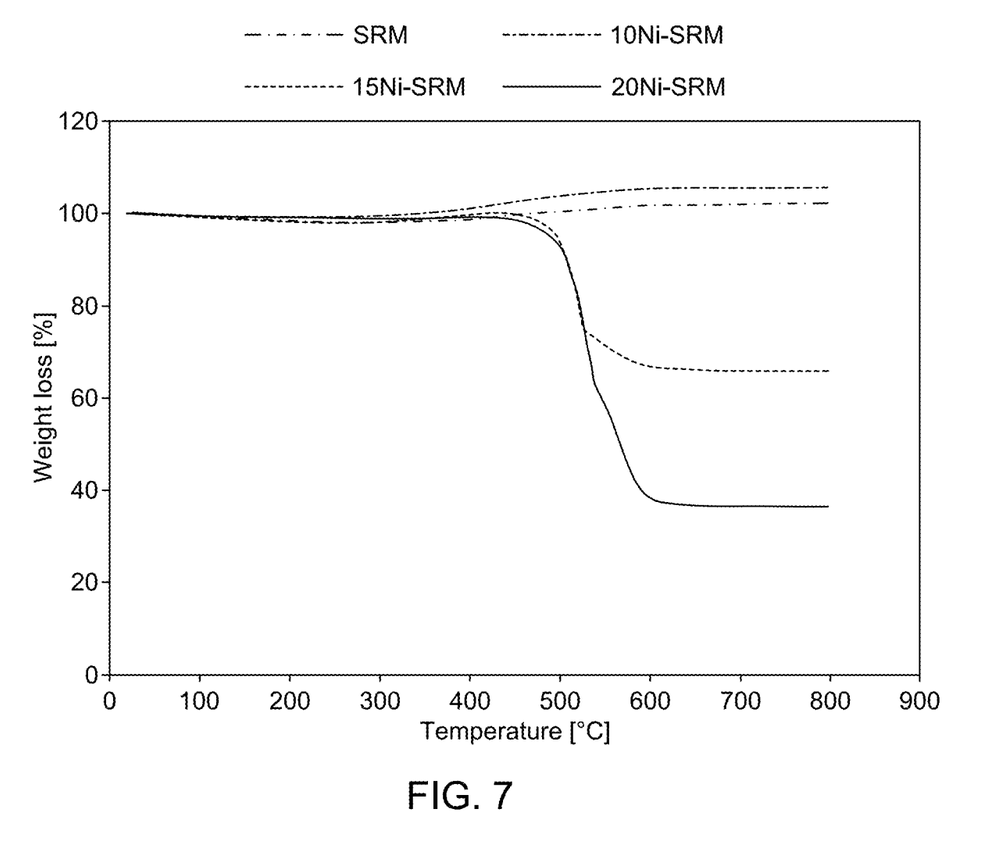
FIG. 7 shows thermogravimetric analysis (TGA) pattern of the SRM and the Ni-SRM catalysts, according to certain embodiments.

Scanning electron microscopy (SEM) and transmission electron microscopy (TEM) are used to identify the morphology of the carbon formed during methane decomposition reaction. As can be seen from FIG. 5A and FIG. 5B, both nanotubes and microtubes of carbon are formed in the 20 Ni-SRM. The microtubes may vary in length and diameter. This observation is further established by TEM, as shown in FIG. 6A and FIG. 6B, where the formation of chain-like carbon nanotubes is evident. Furthermore, metal particles are found to be on both the tip and base of the nanotubes. This suggests that carbon nanotubes/microtubes are formed by following both the tip-growth as well as base-growth mechanisms. Moreover, thermogravimetric analysis (TGA) results, as shown in FIG. 7, indicate no significant weight loss in the case of SRM and 10 Ni-SRM spent samples. This shows that quick deactivation of the above-mentioned samples is assigned to metal particle sintering rather than carbon deposition. In the case of 15 Ni-SRM and 20 Ni-SRM spent samples, a significant amount of weight loss as a function of carbon deposition is observed, suggesting the formation of carbon nanomaterials, including carbon nanotubes and microtubes, as evident from SEM and TEM.

To conclude, all red mud-based samples were examined for various factors, including modification of red mud, impact of phase transformation, composition, and sodium content. However, all red mud-based samples exhibited deactivation over time, but the nickel-based catalysts not only outperformed earlier reported works but also remained stable during the reaction.

Numerous modifications and variations of the present disclosure are possible in light of the above teachings. Therefore, it is to be understood that within the scope of the appended claims, the invention may be practiced other than as specifically described herein.

The invention claimed is:

1. A method for producing hydrogen ($H_2$), comprising:
   introducing a $H_2$-containing feed gas stream into a reactor containing a red mud supported nickel (Ni-SRM) catalyst including Ni-SRM catalyst particles;
   wherein Ni is present in the Ni-SRM catalyst at a concentration of 0.01 to 30 wt. % based on a total weight of the Ni-SRM catalyst;
   passing the $H_2$-containing feed gas stream through the reactor to contact the $H_2$-containing feed gas stream with the Ni-SRM catalyst particles at a temperature of 500 to 700° C. to form an activated Ni-SRM catalyst;
   terminating the introducing the $H_2$-containing feed gas stream;
   introducing and passing a methane ($CH_4$)-containing feed gas stream through the reactor to contact the $CH_4$-containing feed gas stream with the activated Ni-SRM catalyst at a temperature of 600 to 1000° C. thereby converting at least a portion of the $CH_4$ to carbon (C) and $H_2$, and regenerating the Ni-SRM catalyst particles to form a regenerated Ni-SRM catalyst, and producing a residue gas stream leaving the reactor;
   wherein the C formed is deposited on surfaces of the Ni-SRM catalyst particles; and
   separating the $H_2$ from the residue gas stream to generate a $H_2$-containing product gas stream;
   wherein the reactor is a fixed-bed reactor in the form of a cylindrical reactor including:
   a top portion;
   a cylindrical body portion;
   a bottom portion;
   a housing having an open top and an open bottom supportably maintained with the cylindrical body portion;
   wherein the Ni-SRM catalyst is supportably retained within the housing permitting fluid flow therethrough;
   at least one propeller agitator is disposed in the bottom portion of the reactor;
   wherein the bottom portion is cone shaped or pyramidal; and
   wherein a plurality of recirculation tubes fluidly connects the bottom portion of the cylindrical reactor with the cylindrical body portion of the cylindrical reactor.

2. The method of claim 1, wherein the $H_2$ is present in the $H_2$-containing feed gas stream at a concentration of 90 to 99.99 vol. % based on a total volume of the $H_2$-containing feed gas stream.

3. The method of claim 1, wherein the $CH_4$ is present in the $CH_4$-containing feed gas stream at a concentration of 50 to 95 vol. % based on a total volume of the $CH_4$-containing feed gas stream.

4. The method of claim 1, wherein the $CH_4$-containing feed gas stream further includes an inert gas selected from the group consisting of nitrogen, argon, and helium, and wherein a volume ratio of the $CH_4$ to the inert gas present in the $CH_4$-containing feed gas stream is about 3:1.

5. The method of claim 1, wherein the $CH_4$-containing feed gas stream further includes at least one selected from the group consisting of ethane, ethylene, propane, propylene, carbon monoxide, butane, butene, butyne, pentane, pentene, pentyne, hexane, hexene, hexyne, cyclohexane, cyclohexene, heptane, heptene, heptyne, octane, octene, octyne, nonane, nonene, nonyne, and mixtures thereof.

6. The method of claim 1, wherein the Ni-SRM catalyst includes $\alpha\text{-}Fe_2O_3$, $NiFe_2O_4$, $NiO$, $Fe(OH)_3 \cdot H_2O$, $TiO_2$, and aluminosilicate, as determined by X-ray diffraction (XRD) analysis.

7. The method of claim 1, wherein the Ni-SRM catalyst has a hydrogen temperature-programmed reduction ($H_2$-TPR) of from 2.7 to 3.5 mmol/g.

8. The method of claim 1, wherein the Ni-SRM catalyst includes irregular shaped particles and spherical shaped particles.

9. The method of claim 1, wherein the passing the $CH_4$-containing feed gas stream through the reactor is performed at an equivalent space velocity of 6000 to 10000 ml/h/$g_{cat}$ at a temperature of about 800° C.

10. The method of claim 1, wherein the C deposited on surfaces of the Ni-SRM catalyst particles is in the form of carbon nanotubes and carbon microtubes.

11. The method of claim 10, wherein the carbon nanotubes have an average diameter of 20 to 90 nanometers (nm).

12. The method of claim 10, wherein the carbon microtubes have a length in a range of 1 micrometer (μm) to 10 millimeters (mm).

13. The method of claim 1, wherein the residue gas stream leaving the reactor is substantially free from carbon oxides ($CO_x$).

14. The method of claim 1, wherein the method has a $CH_4$ conversion of up to 80% based on an initial weight of the $CH_4$ present in the $CH_4$-containing feed gas stream.

15. The method of claim 1, wherein the method has a $H_2$ yield of up to 90% based on the $CH_4$ conversion.

16. The method of claim 1, further including:
preparing the Ni-SRM catalyst by:
   mixing a nickel salt and a first solvent to form a first mixture;
   adjusting a pH of the first mixture to about 9, and mixing with a red mud material to form a reaction mixture;

heating the reaction mixture to form a catalyst precursor in the reaction mixture; and precipitating the catalyst precursor from the reaction mixture by cooling and calcining at a temperature of 500 to 900° C. to form the Ni-SRM catalyst;

wherein the Ni is present in the Ni-SRM catalyst at a concentration of 10 to 20 wt. % based on a total weight of the Ni-SRM catalyst.

17. The method of claim 16, wherein the nickel salt includes nickel sulfate, nickel acetate, nickel citrate, nickel iodide, nickel chloride, nickel perchlorate, nickel nitrate, nickel phosphate, nickel triflate, nickel bis(trifluoromethanesulfonyl)imide, nickel tetrafluoroborate, nickel bromide, and/or a hydrate thereof.

18. The method of claim 16, wherein the red mud material has a $H_2$-TPR of about 2.82 mmol/g.

* * * * *